(12) United States Patent
Fukasawa

(10) Patent No.: US 9,070,072 B2
(45) Date of Patent: Jun. 30, 2015

(54) IMAGE FORMING APPARATUS CAPABLE OF OBTAINING PRINT DATA FROM EXTERNAL APPARATUS, AND CONTROL METHOD AND STORAGE MEDIUM THEREFOR

(71) Applicant: CANON KABUSHIKI KAISHA, Tokyo (JP)

(72) Inventor: Nobuaki Fukasawa, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/248,629

(22) Filed: Apr. 9, 2014

(65) Prior Publication Data

US 2014/0333960 A1  Nov. 13, 2014

(30) Foreign Application Priority Data

May 13, 2013 (JP) .................................. 2013-101217

(51) Int. Cl.
```
G06F 3/12    (2006.01)
G06K 15/02   (2006.01)
G06K 15/00   (2006.01)
H04N 1/21    (2006.01)
```
(52) U.S. Cl.
CPC ........ *G06K 15/1817* (2013.01); *G06K 15/4095* (2013.01); *G06F 3/1222* (2013.01); *G06F 3/1238* (2013.01); *G06F 3/1267* (2013.01); *G06F 3/1274* (2013.01); *G06F 3/1285* (2013.01); *H04N 1/21* (2013.01)

(58) Field of Classification Search
CPC ... G06F 3/1274; G06F 3/1285; G06F 3/1222; G06F 3/1238; G06F 3/1288; G06K 15/1817; G06K 15/4095; H04N 1/21
See application file for complete search history.

(56) References Cited

U.S. PATENT DOCUMENTS

| | | | | |
|---|---|---|---|---|
| 2010/0185750 A1* | 7/2010 | Nakayama | .................... | 709/219 |
| 2010/0253971 A1* | 10/2010 | Ido et al. | ...................... | 358/1.15 |
| 2011/0261402 A1* | 10/2011 | Yamamoto | .................. | 358/1.15 |
| 2013/0003113 A1* | 1/2013 | Yamada | ........................ | 358/1.15 |

FOREIGN PATENT DOCUMENTS

JP  2010-211627 A  9/2010

* cited by examiner

*Primary Examiner* — Hilina K Demeter
(74) *Attorney, Agent, or Firm* — Rossi, Kimms & McDowell LLP

(57) ABSTRACT

An image forming apparatus that stores print data and retries document information registration when registration of document information of received print data to an external apparatus has failed. If registration of document information to an image forming apparatus with bibliographic server function has failed, print data is stored in the image forming apparatus without setting a storage time limit of the print data and document information registration is retried. The storage time limit of the print data is set and stored, if registration of the document information to the external apparatus has succeeded before the document information registration is retried a predetermined number of times or if the document information registration is retried the predetermined number of times.

8 Claims, 11 Drawing Sheets

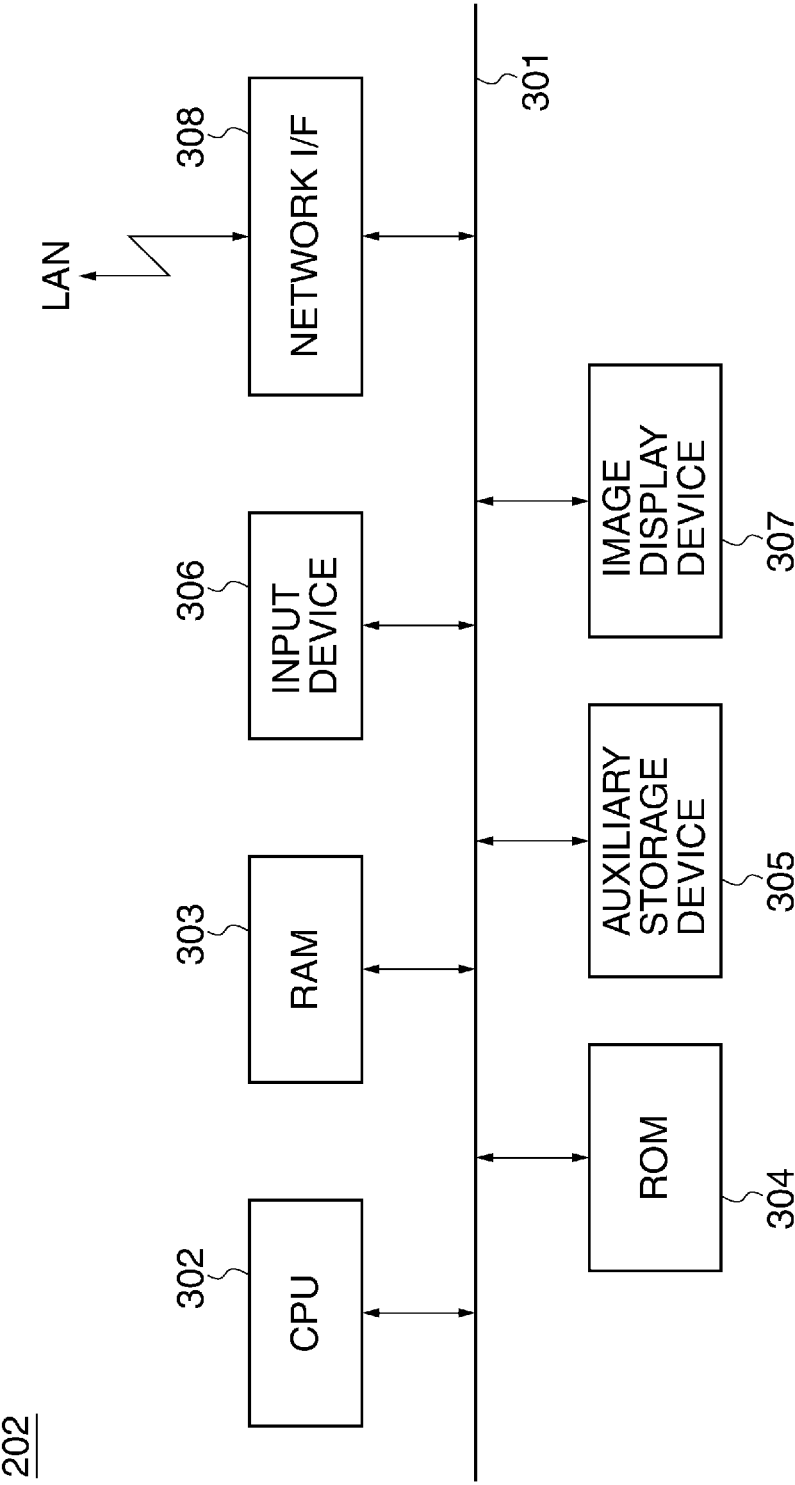

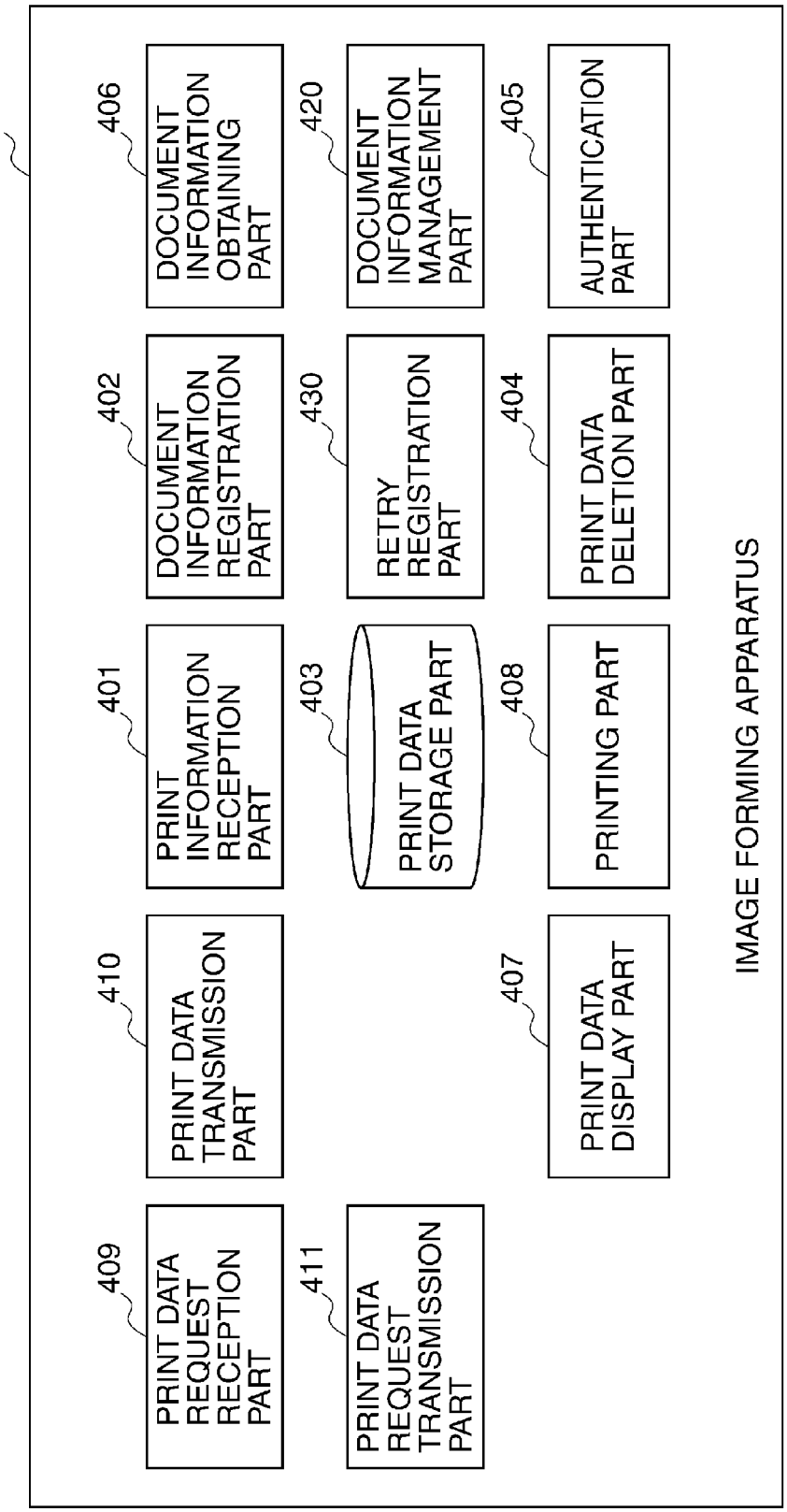

FIG. 5A

USER: YAMADA    501

| 2012.5.21 10:21.12 | 192.168.11 | /pdldata/0015/xxx | AAA.txt | 100 COPIES | 0715 |
| --- | --- | --- | --- | --- | --- |
| 2012.5.30 15:08.32 | 192.168.3.1 | /pdldata/0691/yyy | BBB.pdf | DOUBLE-SIDED | 0802 |
| 2012.6.2 13:44.2112 | 192.168.3.8 | /pdldata/8125/zzz | CCC.doc | 2in1 10 COPIES | 1043 |

USER: SUZUKI    502

| 2012.5.28 09:10.05 | 192.168.3.8 | /pdldata/0015/xxx | AAA.txt | 100 COPIES | 0710 |
| --- | --- | --- | --- | --- | --- |
| 2012.6.1 21:53.02 | 192.168.11 | /pdldata/0691/yyy | BBB.pdf | 4in1 | 0910 |

USER: YAMADA    501

| 2012.5.21 10:21.12 | 192.168.11 | /pdldata/0015/xxx | AAA.txt | 100 COPIES | 0715 |
| --- | --- | --- | --- | --- | --- |
| 2012.5.30 15:08.32 | 192.168.3.1 | /pdldata/0691/yyy | BBB.pdf | DOUBLE-SIDED | 0802 |
| 2012.6.2 13:44.2112 | 192.168.3.8 | /pdldata/8125/zzz | CCC.doc | 2in1 10 COPIES | 1043 |
| 2012.6.3 10:21.41 | 192.168.1.15 | /pdldata/1025/qqq | DDD.txt | 50 COPIES STAPLE | 1387 |

511　501　504　505　506　507　509

801 — TYPE: INPUT
802 — USER NAME: YAMADA
803 — PRINT SETTINGS: NUMBER OF COPIES → 100 COPIES
        STAPLE → ON
804 — PRINT DATA STORAGE DESTINATION: 192.168.1.5
805 — PRINT DATA STORAGE PATH: /pdldata/1025/qqq
806 — PRINT DATA NAME: DDD.pdf
807 — INPUT DATE AND TIME: 2012.6.3 10:21.41
808 — STORAGE TIME LIMIT: 2012.6.4 10:22

IMAGE FORMING APPARATUS CAPABLE OF OBTAINING PRINT DATA FROM EXTERNAL APPARATUS, AND CONTROL METHOD AND STORAGE MEDIUM THEREFOR

BACKGROUND OF THE INVENTION

1. Field of the Invention

The present invention relates to an image forming apparatus and a control method and a storage medium therefor, and more particularly, to an image forming apparatus capable of obtaining print data from an external apparatus by utilizing information that identifies the print data, a control method for the image forming apparatus, and a storage medium storing a program for executing the control method.

2. Description of the Related Art

Conventionally, there is an image forming apparatus configured to immediately print print data (print job) received from an information processing apparatus such as a PC. Thus, if, for example, a user is not around the image forming apparatus, a printed product printed by the image forming apparatus is sometimes left unpicked. To obviate this, an image forming apparatus has been proposed that is configured not to immediately print received print data but to print the print data after user authentication.

For example, in an image processing apparatus of a printing system disclosed in Japanese Laid-open Patent Publication No. 2010-211627, when print data with a user ID is received from an information processing apparatus, the print data is stored and document information that identifies the print data is generated and registered to a bibliographic server. At the time of printing the print data, if the print data can be printed by the image processing apparatus itself, the image processing apparatus transmits a document information obtaining request to the bibliographic server together with the user ID and receives from the bibliographic server and displays a document information list corresponding to the user ID. When print data to be printed is selected from the displayed list by the user, the image forming apparatus prints the selected print data. On the other hand, if the print data cannot be printed by the image processing apparatus itself, the image processing apparatus suspends a printing process. An alternative printing process is performed by another image processing apparatus.

If the image processing apparatus of the printing system described above is configured not to store received print data when registration of document information of the received print data to the bibliographic server has failed, there is a fear that the print data cannot be printed by the image processing apparatus that received the print data. It is therefore preferable that the image processing apparatus be configured to store print data even when the registration of document information has failed.

However, with the image processing apparatus configured in that way, document information of print data is not present in the bibliographic server when registration of the document information has failed, so that the print data still cannot be printed by another image processing apparatus. In a case, for example, that the image processing apparatus that received the print data is currently in use by another user, the image processing apparatus cannot request another image processing apparatus to perform alternative printing, so that the user must wait for his/her turn.

In an image forming apparatus configured to print print data after user authentication to thereby prevent a printed product from being left unpicked, print data received by the image forming apparatus is sometimes set with a storage time limit. In that case, the storage time limit is set not for the purpose of storing the print data in the image forming apparatus, but for the purpose of preventing a printed product from being left unpicked. Thus, there is a possibility that the storage time limit of print data has expired and the print data has already been deleted when the user's turn to use the image forming apparatus comes.

SUMMARY OF THE INVENTION

The present invention provides an image forming apparatus that stores print data and retries document information registration when registration of document information of received print data to an external apparatus has failed, and provides a control method for the image forming apparatus and a storage medium storing a program for executing the control method.

According to one aspect of this invention, there is provided an image forming apparatus comprising a reception unit configured to receive print data, a registration unit configured to register information for identifying the print data, a storage unit configured to store the print data, and a control unit configured to, in a case where registration of the information by the registration unit has failed, cause the storage unit to store the print data without setting a storage time limit to the print data and cause the registration unit to retry the registration of the information, wherein the control unit is configured to, in a case where registration has succeeded or in a case where the registration of the information is retried a predetermined number of times, set the storage time limit.

With this invention, received print data is not canceled even if registration of document information of the print data to an external apparatus made by an image forming apparatus that received the print data has failed, so that the print data can be stored in and printed by the image forming apparatus. In a case where document information registration has failed and the print data is then printed by the image forming apparatus that received the print data, it is possible to reduce a possibility that a storage time limit of the print data has expired and the print data has been deleted before the user uses the image forming apparatus.

Further features of the present invention will become apparent from the following description of exemplary embodiments (with reference to the attached drawings).

BRIEF DESCRIPTION OF THE DRAWINGS

FIG. 3 is a block diagram showing an example hardware structure of a client PC shown in FIG. 1;

FIG. 4 is a block diagram showing an example software structure of the image forming apparatus with bibliographic server function;

FIGS. 5A to 5C are views each showing an example of a list of document information managed by a document information management part of the image forming apparatus with bibliographic server function;

DESCRIPTION OF THE EMBODIMENTS

The present invention will now be described in detail below with reference to the drawings showing a preferred embodiment thereof.

Figure 1:
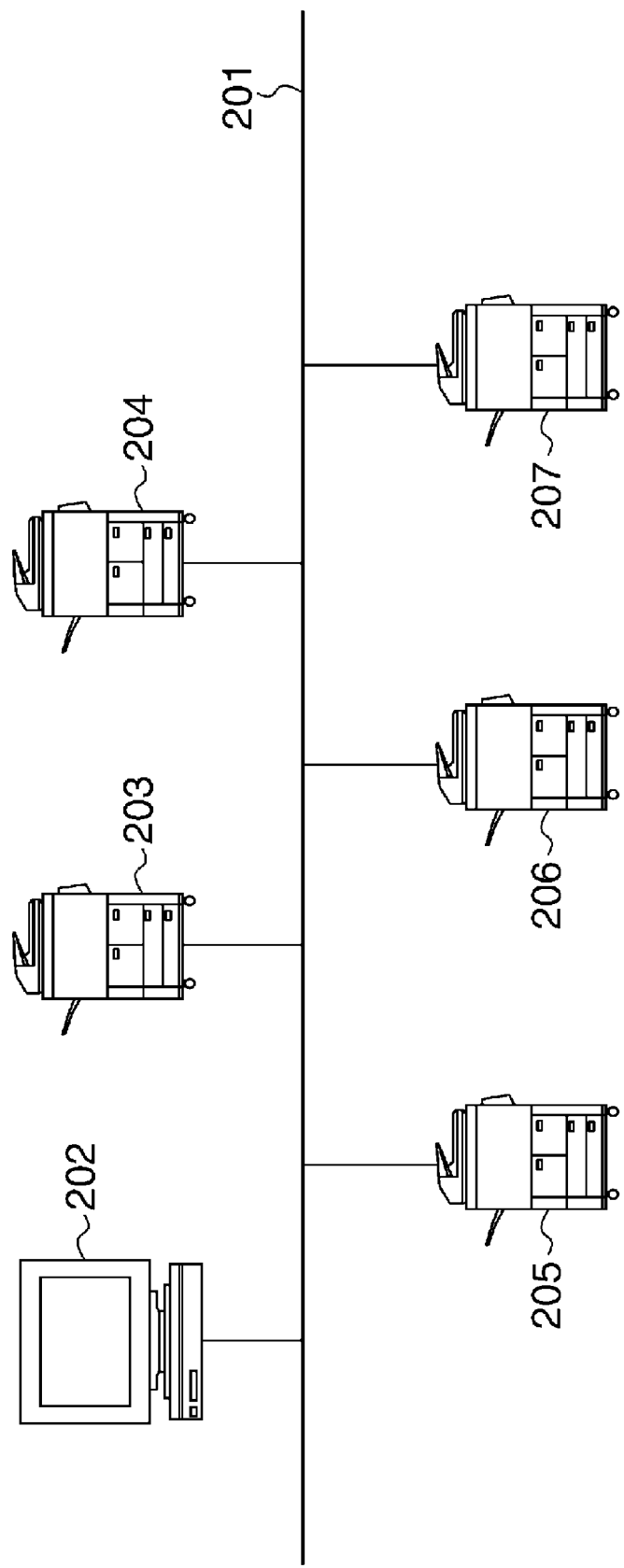
FIG. 1 is a view showing an example of an image forming system including image forming apparatuses according to one embodiment of this invention.

FIG. 1 shows an example of an image forming system including image forming apparatuses according to one embodiment of this invention.

In the image forming system, a client PC 202 and image forming apparatuses 203-207 are connected to a LAN (local area network) 201. The image forming apparatus 203 (hereinafter, sometimes referred to as the bibliographic server 203) has a bibliographic server function of totally managing pieces of print data input from the client PC 202 to each of the image forming apparatuses. The bibliographic server 203 manages (on a per user basis) pieces of print data input to each image forming apparatus.

It should be noted that although the bibliographic server of this embodiment is constituted by the image forming apparatus 203, an ordinary server PC may be used as the bibliographic server. Although the client PC 202 serves as a print data input source in this embodiment, a portable terminal or an image forming apparatus or the like may be used instead of the client PC 202.

When a user is authenticated and logs into any of the image forming apparatuses 203-207, the image forming apparatus to which the user has logged in obtains from the bibliographic server 203 a list of print data associated with the login user and displays the obtained list. To obtain the list of print data from the bibliographic server 203, an IP address of the bibliographic server 203 is registered in advance in each of the image forming apparatuses 204-207. When print data is selected by the user from the print data list displayed by the image forming apparatus to which the user has logged in, the image forming apparatus obtains the selected print data from an image forming apparatus in which the selected print data is stored, and prints the obtained print data.

Figure 2:
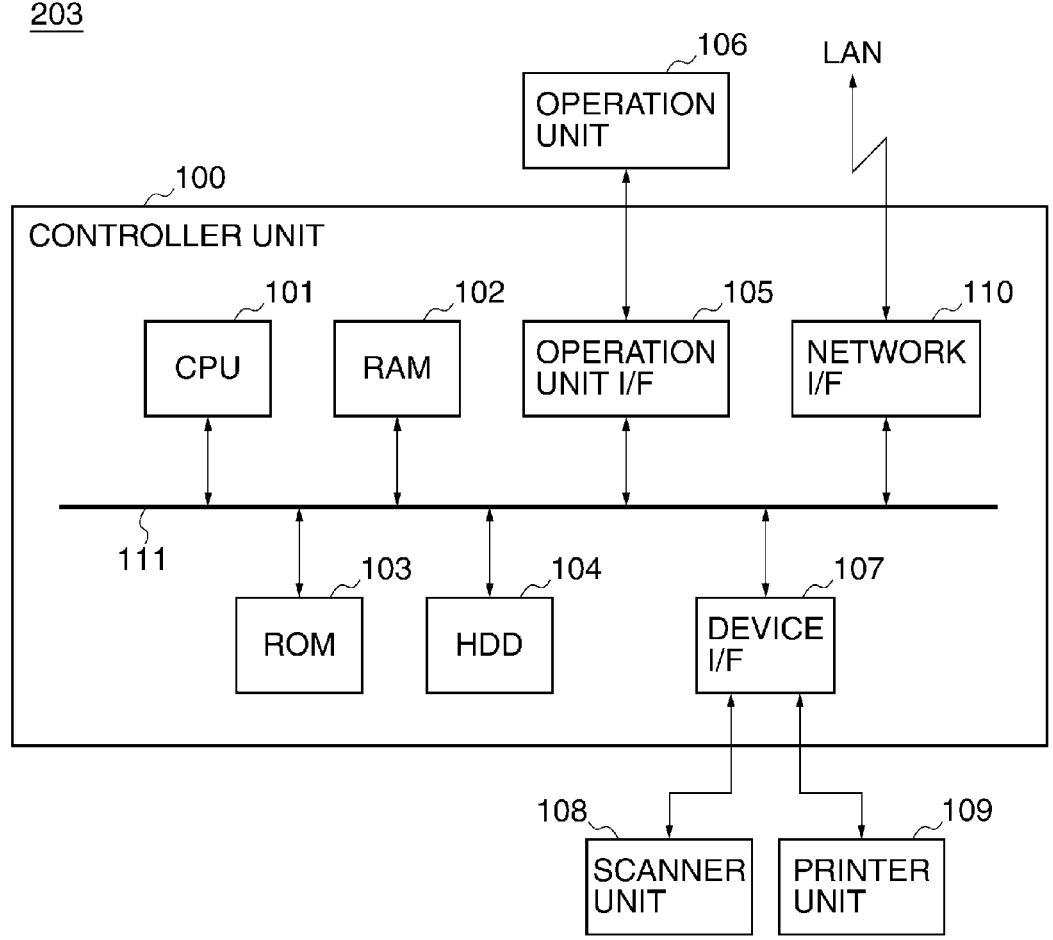
FIG. 2 is a block diagram showing an example hardware structure of an image forming apparatus shown in FIG. 1 with bibliographic server function.

FIG. 2 shows in block diagram an example hardware structure of the image forming apparatus 203. It should be noted that each of the image forming apparatuses 204-207 is basically the same in hardware structure as the image forming apparatus 203, and a description thereof will be omitted.

As shown in FIG. 2, the image forming apparatus 203 has a controller unit 100 that controls the image forming apparatus 203. The controller unit 100 includes a CPU 101, a RAM 102, a ROM 103, an HDD 104, an operation unit I/F 105, a device I/F 107, and a network I/F 110, which are connected to a system bus 111.

The CPU 101 totally controls respective parts of the controller unit which are connected to the system bus 111. The RAM 102 is a system work memory used by the CPU 101 for its operation, and serves as an image memory that temporarily stores image data. In the RAM 102, programs (such as an operating system (OS), system software, and application software) and data are also stored. The ROM 103 is stored with a system boot program, and sometimes stored with system programs and application programs. Information such as fonts required for the image forming apparatus can also be stored in the ROM 103.

The HDD (hard disk drive) 104 stores OS, system software, application software, image data, setting data, etc. Programs stored in the RAM 102 are executed by the CPU 101, whereby image data and other data stored in the RAM 102 or in the ROM. 103 or in the HDD 104 are processed. It should be noted that some small-sized image forming apparatus does not have the HDD 104 and sometimes uses a flash memory such as an SSD (solid state disk) or the like instead of the HDD 104. In that case, system software, application software, etc. can be stored in the ROM 103 or the like.

The operation unit I/F 105 is connected with an operation unit 106. The operation unit 106 has a display device such as a touch panel for notifying a state of the apparatus and for receiving a user's operation, and also has operation buttons for receiving user's instructions, and the like.

The device I/F 107 is connected with a scanner unit 108 and a printer unit 109, which are image input and output devices. Image data input and output are performed via the device I/F 107. For example, image data is input from the scanner unit 108 to the device I/F 107 and stored into the RAM 102 or the HDD 104, and subjected to image processing performed, where required, by an application program. Image data is output to the printer unit 109 via the device I/F 107.

The network I/F 110 is connected to the LAN. Image data stored in external devices on the LAN (such as other image forming apparatuses and client PC) and information for controlling the image forming apparatus are exchanged via the network I/F 110.

It should be noted that the construction of the controller unit 100 is not limited to the illustrated one. In a case, for example, that the image forming apparatus has a FAX function, a modem interface may be provided in the controller unit 100 to connect the apparatus via a modem with a public line for FAX transmission. A USB I/F (not shown) may be provided in the controller unit 100 to read and to print data stored in e.g. a flash memory card.

FIG. 3 shows in block diagram an example hardware structure of the client PC 202.

The client PC 202 has a CPU 302 that controls the entire client PC 202, a RAM 303 that serves as e.g. a system work memory used by the CPU 302 for its operation, and a ROM 304.

An auxiliary storage device 305 is constituted by e.g. a hard disk drive and stored with control programs. An image display device 307 is a display unit (e.g. a liquid crystal display) used to notify a message to the user. An input device 306 is an operation unit used by the user for input operation and constituted by e.g. a mouse and a keyboard. A network I/F 308 is a network I/F that exchanges data via the LAN 201 with external network devices, which include the image forming apparatuses 203-207. The respective parts 302-308 of the client PC 202 are connected to a main bus 301.

In the following, a description will be given of a method for user authentication by the image forming apparatuses 203-207.

To allow particular users to login and to record user's operations, user authentication is performed by each of the image forming apparatuses 203-207. To this end, a database of authentication information (user name and password pairs), which will be referred to as the user database, is held in the HDD 104 of each image forming apparatus.

Figure 12A:
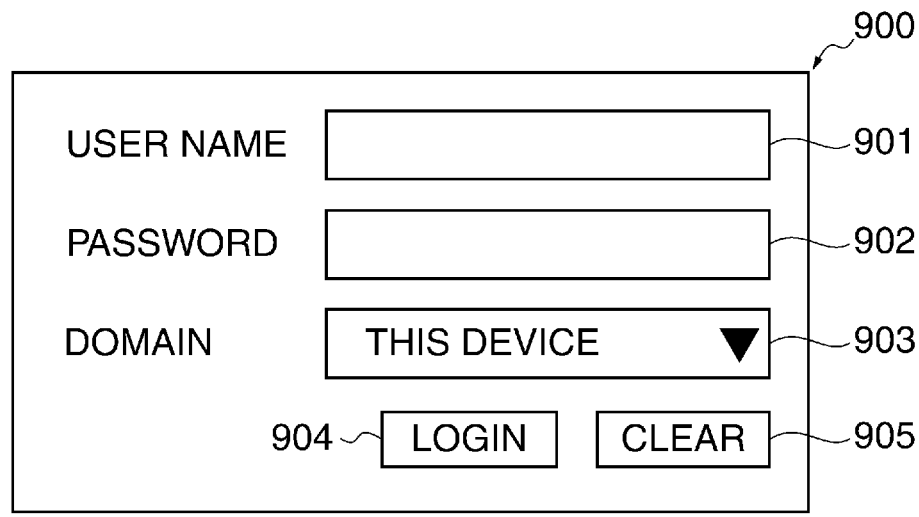
FIG. 12A is a view showing an example of an authentication screen displayed on an operation unit of each of the image forming apparatuses.

An authentication screen 900 shown in FIG. 12A is displayed on the operation unit 106 of each of the image forming apparatuses 203-207. On the authentication screen 900, there are displayed a user name input field 901 for inputting a user name, a password input field 902 for inputting a password, a domain setting field 903 for enabling a user to select an authentication destination using a drop down list, a login button 904, and a clear button 905.

When the login button 904 is pressed, a user name input to the user name input field 901 and a password input to the password input field 902 are sent to the authentication part (denoted by reference numeral 405 in FIG. 4) of the image forming apparatus. The authentication part 405 performs user authentication based on the user name and the password input on the authentication screen 900, while referring to the user database stored in the HDD 104 of the image forming apparatus. Each user is allowed to make an operation only when the input user name and password are coincident with any one of the user name and password pairs in the user database.

When the clear button 905 is pressed, user authentication is not performed, and contents input to the user name input field 901 and the password input field 902 are cleared.

It should be noted that the user databases of the image forming apparatuses 203-207 can be synchronized with one another by a known method, whereby user authentication can be performed in the same condition by the image forming apparatuses 203-207.

The method of user authentication is not limited to the above-described method. For example, user authentication can be made by an external authentication server instead of being performed by each image forming apparatus based on the built-in user database. More specifically, the image forming apparatuses 203-207 can be configured to belong to a domain of authentication system such as Microsoft Active Directory. The authentication part 405 of each image forming apparatus inquires an authentication server on a network selected in the domain settings field 903 about whether authentication information input by the user is valid.

A contactless IC card stored with information required for authentication can be used for user authentication. In a case where the image forming apparatus is used via a network, e.g., in a case where a connection to the image forming apparatus is established via a browser or via a file sharing protocol, it is possible to request a connection source to perform user authentication and to permit only an authenticated user to use the image forming apparatus.

Next, a description will be given of operations in a case where print data of page description language (PDL) such as LIPS of Canon Inc. or PostScript of Adobe Systems Inc. is input from the client PC 202 to any of the image forming apparatuses (e.g. image forming apparatus 204).

The image forming apparatus 204 interprets and prints PDL data. The PDL data can be interpreted by the CPU 101 by executing a program stored in the ROM 103 or in the HDD 104, and can also be interpreted by a hardware PDL interpreter.

It should be noted that print data is not limited to PDL data, but may be data of any format that can be analyzed and printed by the image forming apparatus 204, such as TIFF or JPEG image data or application document data.

The user starts a printer driver from an application program in the client PC 202, selects the image forming apparatus 204 on a printer driver screen (not shown), and gives a print instruction. Upon reception of the print instruction, the image forming apparatus 204 requests the printer driver of the client PC to transmit authentication information.

Figures 10, 11:
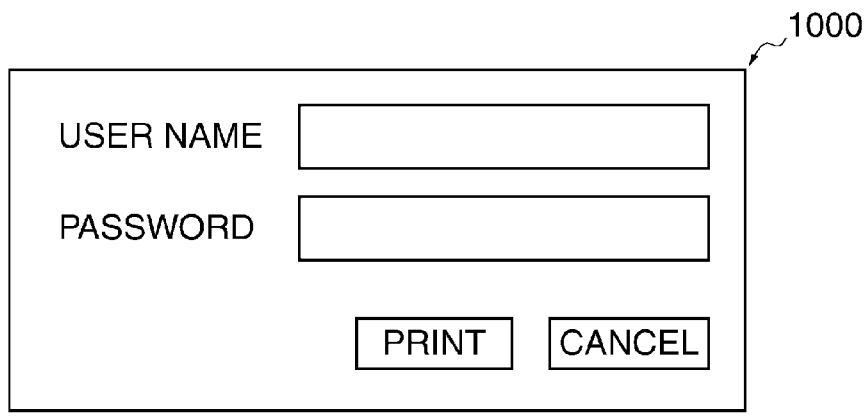
FIG. 10 is a view showing an example of an authentication screen displayed on an image display device of the client PC.
FIG. 11 is a view showing an example of document information transmitted to the image forming apparatus with bibliographic server function.

The printer driver of the client PC 202 displays an authentication screen 1000 such as one shown in FIG. 10. When a user name and a password are input by the user on the authentication screen 1000, the input user name and password (authentication information) are transmitted from the client PC 202 to the image forming apparatus 204 and checked against the user database in the image forming apparatus 204, whereby user authentication is performed.

If a result of collation between the input authentication information and the user database indicates noncoincidence, the print instruction given from the client PC 202 is determined as an error. On the other hand, if the collation result indicates coincidence, use permission information is sent to the client PC 202. The client PC 202 sends print data obtained by converting application data into PDL data, user information (such as user name), and printing control information that includes print settings such as double-sided printing to the image forming apparatus 204.

In the user authentication of this embodiment, the authentication information (user database) in the image forming apparatus 204 is used, but this is not limitative. In a case, for example, that the client PC 202 and the image forming apparatus 204 belong to the same authentication domain and a result of authentication by the client PC 202 can be guaranteed, printing control information including user information may be transmitted from the client PC 202 to the image forming apparatus 204 instead of performing the user authentication by the image forming apparatus 204.

Instead of inputting the authentication information on the authentication screen 1000 of the client PC 202, printing control information including a user name in the client PC 202 may be transmitted from the client PC 202 to the image forming apparatus 204. Even in that case, if the user name which is the same as the user name in the client PC is registered in the image forming apparatus 204, user authentication is performed and printing is performed after the user authentication, whereby a printed product can be prevented from being furtively glanced at by other user.

FIG. 4 shows in block diagram an example software structure of the bibliographic server (image forming apparatus with bibliographic server function) 203. It is assumed that functions of respective apparatus parts shown in FIG. 4 are achieved by the CPU 101 by executing programs for controlling the image forming apparatus 203. The software structure of each of the image forming apparatuses 204-207 is the same as that of the bibliographic server 203, except that it does not have a document information management part 420. Each image forming apparatus may be provided with e.g. a component part for FAX processing (not shown in FIG. 4).

In the following, a description will be given of a case where PDL data is transmitted to the image forming apparatus 204 from application software in the client PC 202 by using the printer driver. As previously described, the PDL data can be interpreted by CPU 101 or by the PDL interpreter.

In this embodiment, PDL data created in the client PC 202 by the printer driver, etc. and printing control information that includes print settings for the PDL data and user information are sent from the client PC 202 to the image forming apparatus 204 via the LAN 201. Alternatively, PDL data that contains the printing control information may be sent from the client PC 202 to the image forming apparatus 204 and the printing control information may be extracted from the PDL data by a printing part 408 of the image forming apparatus 204.

In the image forming apparatus 204, the PDL data and the printing control information sent from the client PC 202 are received via the LAN 201 and the network I/F 110 by a print information reception part 401 that requests a print data storage part 403 to store the PDL data, whereby the print data is stored via the system bus 111 into the RAM 102 or the HDD 104.

Next, a description will be given of a case where printing is not performed upon reception of PDL data, but performed after user authentication by the image forming apparatus 204.

The document information registration part 402 of the image forming apparatus 204 receives information representing a storage destination of PDL data in the print data storage part 403 and printing control information from the client PC 202. Next, the document information registration part 402 transmits the printing control information, information that identifies the image forming apparatus 204 (e.g. IP address of the image forming apparatus 204), and document information to the bibliographic server 203.

It should be noted that the information for identifying the image forming apparatus 204 may be identification information other than the IP address of the image forming apparatus 204. The printing control information to be transmitted to the bibliographic server 203 may be contained in PDL data and may be extracted from the PDL data after reception of the PDL data. Document information equivalent to that registered in the bibliographic server 203 may be stored as a part of print data in the print data storage part 403.

FIG. 11 shows an example of document information transmitted to the bibliographic server 203. The document information is information that identifies print data. As shown in FIG. 11, the document information has fields 801-808 of type, user name, print settings, print data storage destination, print data storage path, print data name, input date and time, and storage time limit.

In the type field 801, type information that represents the type of document information is indicated. In the illustrated example, type information "Input" that represents input of print data is indicated in the type field 801. Based on printing control information, user name is indicated in the user name field 802 and print settings are indicated in the print settings field 803.

In the print data storage destination field 804, an IP address of an image forming apparatus is recorded that identifies an image forming apparatus in which print data is stored. In the print data storage path field 805, a storage path of print data in the image forming apparatus stored with the print data is recorded. In the illustrated example, a storage path "/pdldata/1025/qqq" of print data (PDL data) in the image forming apparatus 204 is recorded.

In the print data name field 806, a print data name is indicated. The print data name, which is provided for display of a list of print data to be printed as described later, is automatically provided when a print instruction is given from the client PC 202 or designated by the user at the time of printing. In the input date and time field 807, a date and time when print data is input are indicated. In the storage time limit field 808, a storage time limit of print data is indicated.

When document information is transmitted to the bibliographic server 203 from the image forming apparatus 204 input with print data, the document information management part 420 of the bibliographic server 203 receives the document information. The document information management part 420 manages pieces of document information for all the users on a per user basis.

FIGS. 5A to 5C each show an example of a list of document information managed by the document information management part of the bibliographic server 203. In FIG. 5A, a document information list 501 for user "Yamada" is shown. In FIG. 5B, a document information list 502 for user "Suzuki" is shown. In FIG. 5C, a state that document information 511 is added to the document information list 501 for user "Yamada" is shown. In other words, among document information for all the users managed by the document information management part 420, only the document information for user "Yamada" and the document information for user "Suzuki" are shown in FIGS. 5A to 5C.

The document information list for each user has fields 503-508 of input date and time, print data storage destination, print data storage path, print data name, print settings, and ID. Pieces of information stored in the fields 503-508 of the document information list correspond to pieces of information contained in the document information of FIG. 11, which are transmitted to the bibliographic server 203.

In the input date and time field 503, a date and time when print data is input is indicated. In the print data storage destination field 504, an IP address of an image forming apparatus in which print data is stored is indicated. In the print data storage path field 505, a storage path of print data in the image forming apparatus stored with the print data is indicated. In the print data name field 506, print data name is indicated. In the print settings field 507, print settings are indicated. In the ID field 508, an ID for identifying document information is indicated. It should be noted that document information can be identified by information (e.g. user name and print data name) other than the ID.

When print data is input to any of the image forming apparatuses, document information shown in FIG. 11 is sent from the image forming apparatus to the bibliographic server 203. The document information management part 420 of the bibliographic server 203 adds the received document information to a document information list for the corresponding user. In FIG. 5C, there is shown an example where document information 511 associated with user "Yamada" is received and added to document information list 501 for user "Yamada."

A list of print data or print objects is displayed by the image forming apparatus 205 when print data input to the image forming apparatus 205 is printed after the user is authenticated and logs into the image forming apparatus 205.

When the user logs into the image forming apparatus 205, the document information obtaining part 406 of the image forming apparatus 205 requests the bibliographic server 203 to transmit the list of print data associated with the authenticated user. In this embodiment, transmission of the print data list is requested in response to logging in of the user. Alternatively, transmission of the print data list may be requested when a particular operation is performed after the login. When requesting the transmission of the print data list, the document information obtaining part 406 delivers the login user's name to the bibliographic server 203.

In response to the transmission request, the document information management part 420 of the bibliographic server 203 confirms whether there is a document information list associated with the user's name received together with the transmission request. If there is no such document information list, a print object list (which is empty) is sent back to the image forming apparatus 205 serving as the request source. On the other hand, if there is a document information list corresponding to the received user's name, the document information management part 420 creates and sends back to the image forming apparatus 205 a print object list in which pieces of information of print data associated with the user name are collected.

The print object list may be one that is equivalent to e.g. the document information list managed on a per user basis by the document information management part 420 of the bibliographic server 203. In a case, for example, that transmission of the print data list for user "Yamada" is requested, the document information management part 420 sends back to the image forming apparatus 205 the document information list for user "Yamada" (shown by way of example at 501 in FIGS. 5A and 5C) as the print object list. It should be noted that information required for the list display may be extracted from the document information list and the extracted information may be sent.

In the image forming apparatus 205, the document information obtaining part 406 obtains the print object list from the bibliographic server 203 and delivers the obtained list to the print data display part 407. The print data display part 407 merges a print object list retrieved from the print data storage part 403 with the print object list obtained from the bibliographic server 203. The print object list merged by the print data display part 407 is displayed on the operation unit 106 of the image forming apparatus 205.

Figure 12B:
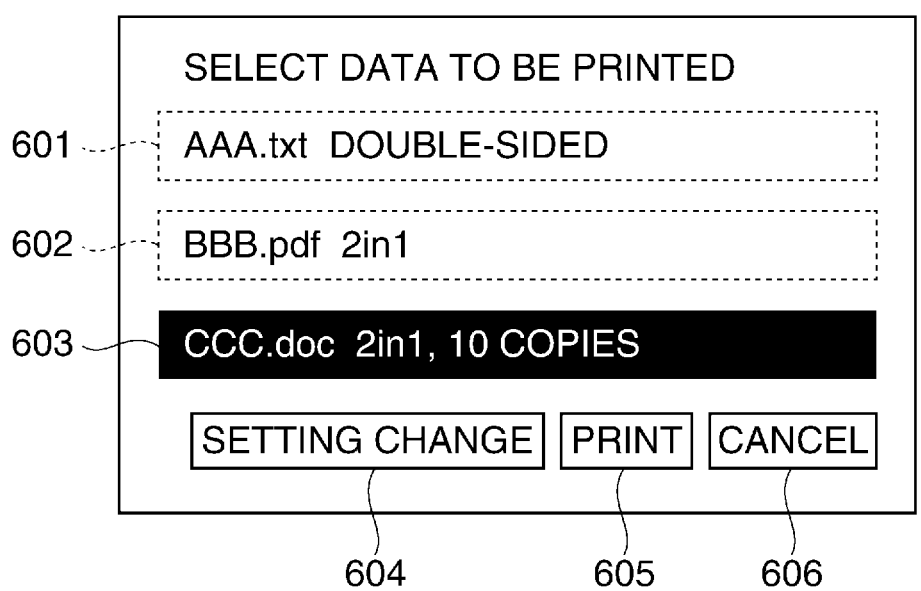
FIG. 12B is a view showing a print object list display screen displayed on the operation unit.

FIG. 12B shows an example of the print object list displayed on the operation unit 106. In the example of FIG. 12B, names of three pieces of print data 601-603 input by the user are displayed together with print settings on the operation unit 106. When the user selects desired print data and presses a setting change button 604, a setting change screen (not shown) for changing the print settings is displayed, thereby enabling the user to change the number of copies, staple setting, etc. The user can instruct printing by pressing a print button 605. In the example of FIG. 12B, the print data 603 is selected. When the print button 605 is pressed, the print data 603 is printed. The user can cancel print settings change and/or data selection by pressing a cancel button 606.

Next, a description will be given of a case where the user who has been authenticated by and has logged into the image forming apparatus 205 selects one of the print data 601-603 from the print object list displayed on the operation unit 106 and instructs printing. It should be noted that entities of the print data 601-603 shown in FIG. 12B may be stored in any of the image forming apparatuses.

In a case, for example, that the user selects the print data 601 and presses the print button 605 to instruct printing and that the entity of the print data 601 is present in the image forming apparatus 204, the image forming apparatus 205 requests the image forming apparatus 204 to transmit the print data 601.

More specifically, a print data obtaining request is sent from a print data request transmission part 411 of the image forming apparatus 205 to a print data request reception part 409 of the image forming apparatus 204. The print data request reception part 409 confirms information of print data storage destination indicated in the print data obtaining request, and obtains the print data from the print data storage part 403. The obtained print data is transmitted by a print data transmission part 410 to the image forming apparatus 205. In the image forming apparatus 205, the print information reception part 401 receives and delivers the print data to the printing part 408 via the print data storage part 403. The printing part 408 converts the print data into data that can be printed by the image forming apparatus 205.

If print data is stored in the image forming apparatus 205, the print data storage part 403 of the image forming apparatus 205 may notify the printing part 408 of a storage location of the print data, instead of obtaining the print data from the print data storage part 403 by the print data request reception part 409 of the image forming apparatus 204 in response to the print data obtaining request from the print data request transmission part 411 of the image forming apparatus 205.

In the image forming apparatus 205, the print data storage part 403 is requested to store the received PDL data. When the PDL data is stored via the system bus 111 into the RAM 102 or the HDD 104, control is transferred to the printing part 408 in which the PDL data is interpreted and converted into data that can be printed by the image forming apparatus 205. The converted data is image-processed according to the print settings indicated in the printing control information corresponding to the PDL data or according to print settings changed by the user. Upon completion of the image processing, the printing part 408 delivers the image-processed image data to the printer unit 109 via the system bus 111 and the device I/F 107. The delivered data is printed on a sheet by the printer unit 109. Upon completion of printing, the printing part 408 notifies the document information management part 420 of the bibliographic server 203 that the print data has been printed.

To delete the print data, the document information management part 420 transmits a request for deletion of the print data to the print data deletion part 404 of the image forming apparatus 204 stored with the print data, and deletes the document information of the print data stored in the document information management part 420.

To hold the print data for a predetermined period of time, the document information management part 420 records information representing that the print data has been printed, without requesting deletion of the print data and without deleting the document information. In this embodiment, completion of printing is notified to the bibliographic server 203 after the printing is completed. In addition (or alternatively), the status of printing may be notified to the bibliographic server 203 at start of or during the printing.

Figure 6:
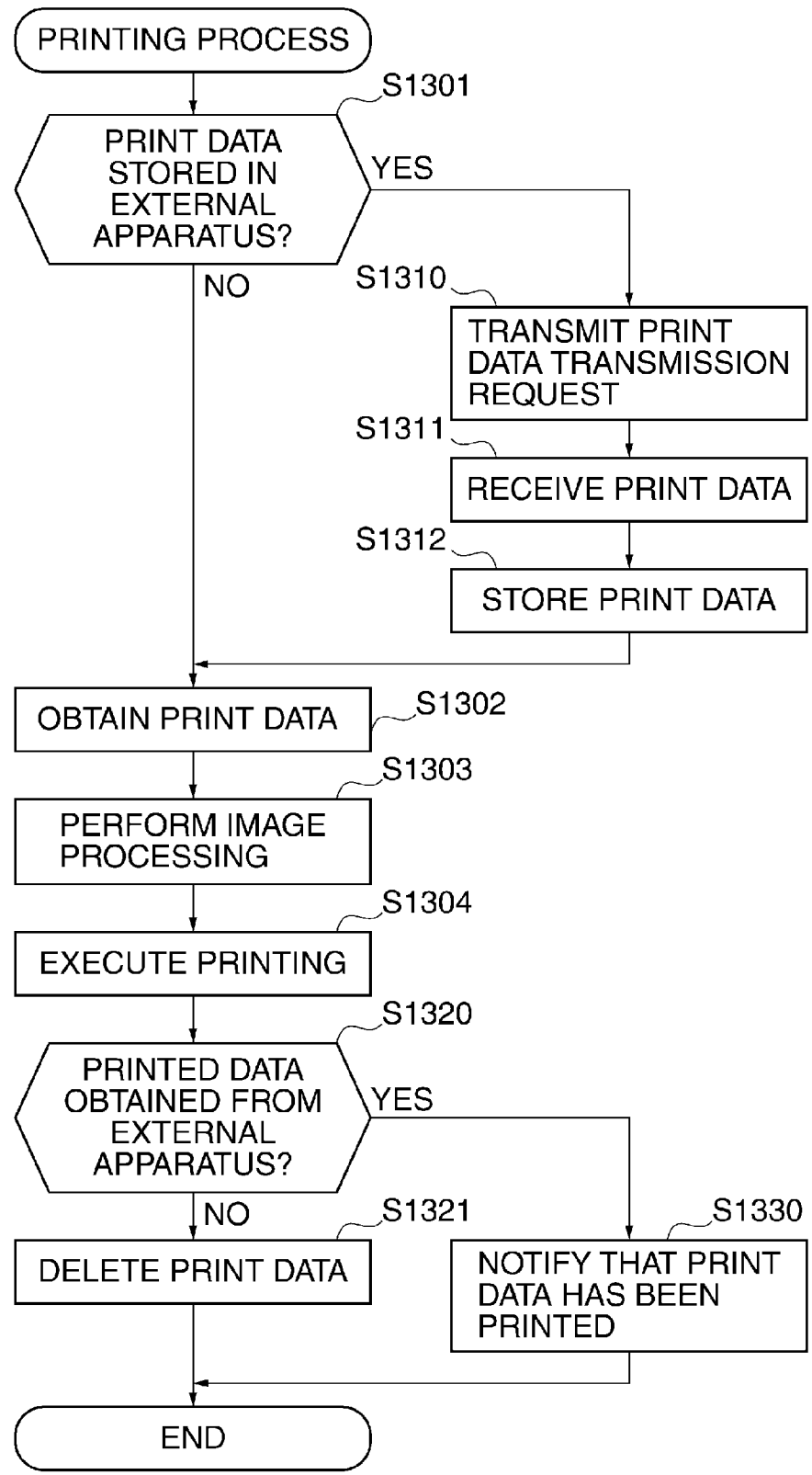
FIG. 6 is a flowchart showing the flow of a printing process executed by a printing part of each of the image forming apparatuses.

FIG. 6 shows in flowchart the flow of a printing process executed by the printing part 408 of the image forming apparatus 205.

In step S1301, the printing part 408 determines whether print data selected by the user from the print object list is stored in any of the external image forming apparatuses other than the image forming apparatus 205 that will print the print data. If the print data is stored in the image forming apparatus 205 (NO to step S1301), the process proceeds to step S1302.

On the other hand, if the print data is stored in any of the external image forming apparatuses other than the image forming apparatus 205 (YES to step S1301), the printing part 408 transmits a print data transmission request to the print data request transmission part 411 (step S1310). Next, the print information reception part 401 receives the print data (step S1311), and delivers the received print data to the print data storage part 403 for data storage (step S1312). Then, the process proceeds to step S1302.

In step S1302, the printing part 408 obtains the print data from the print data storage part 403. Next, the printing part 408 converts the obtained print data into data that can be printed by the image forming apparatus 205 and performs image processing on the converted data according to the print settings (step S1303), and delivers the image-processed data to the printer unit 109 for execution of printing (step S1304).

Next, in step S1320, the printing part 408 determines whether the printed data was obtained from any of the external image forming apparatuses.

If the printed data was obtained from any of the external image forming apparatuses (YES to step S1320), the printing part 408 notifies, in step S1330, the document information management part 420 of the bibliographic server 203 that the print data has been printed, and completes the present process. On the other hand, if the printed data is stored in the image forming apparatus 205 (NO to step S1320), the printing part 408 requests, in step S1321, the print data storage part 403 to delete the print data stored in the image forming apparatus 205 and completes the present process.

In each of the image forming apparatuses 203-207, when print data is input, the print information reception part 401 stores information that represents a predetermined storage time limit. In this embodiment, the storage time limit information is stored as a part of document information, but this is not limitative. For example, the storage time limit information can be delivered to the print data storage part 403 so as to be stored as a part of print data. In the example of FIG. 11, information "2012.6.4 10:22" representing the storage time limit of print data "DDD.pdf" is indicated in the storage time limit field 808 of document information. In other words, the storage time limit information is stored in the document information.

Figure 7:
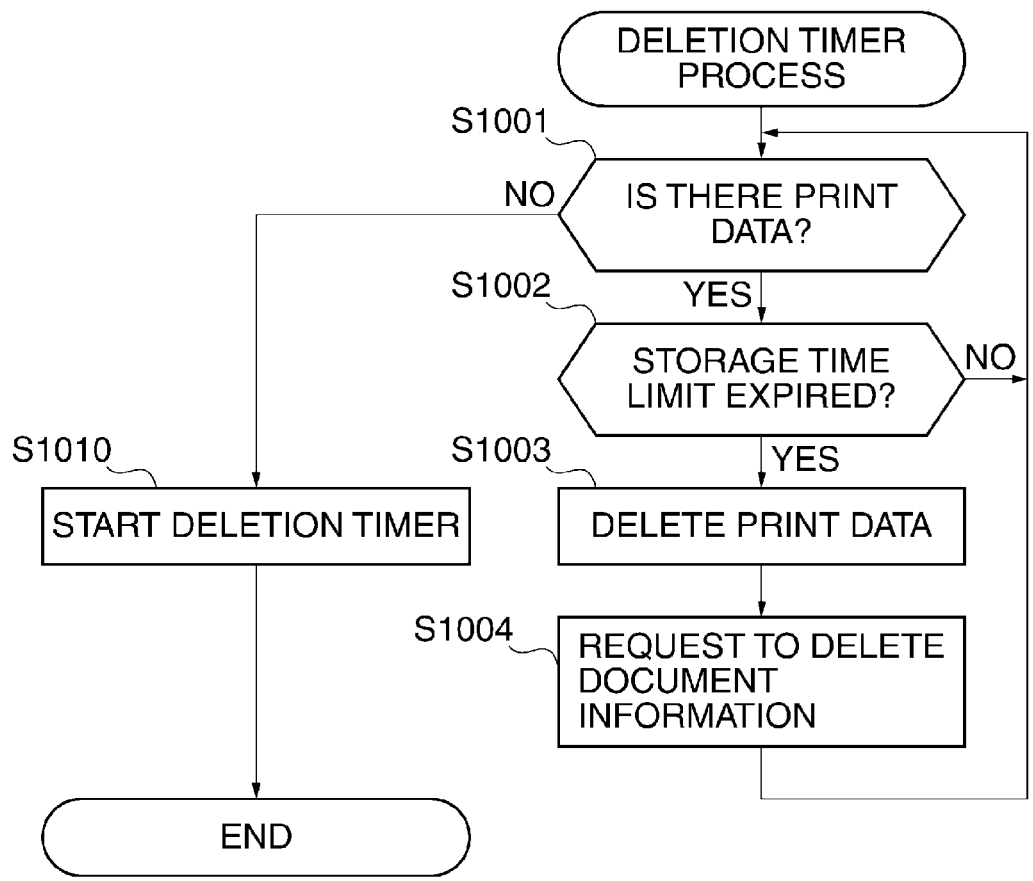
FIG. 7 is a flowchart showing the flow of a deletion timer process executed by a print data deletion part of each of the image forming apparatuses.

FIG. 7 shows in flowchart the flow of a deletion timer process executed by the print data deletion part 404 of the image forming apparatus 205. The deletion timer process is executed at predetermined time intervals.

In step S1001, the print data deletion part 404 inquires the print data storage part 403 about the presence or absence of print data, and determines whether there is print data. If there is one or more pieces of print data in the print data storage part 403 (YES to step S1001), one of the pieces of print data is selected, and the process proceeds to step S1002 in which whether the storage time limit of the selected print data has expired is checked. If the storage time limit of the print data has not expired (NO to step S1002), the process returns to step S1001 in which whether, among the pieces of print data stored in the print data storage part 403, there remains print data for which it has not been checked whether the storage time limit has expired.

If the storage time limit of the selected print data has expired (YES to step S1002), the print data deletion part 404 deletes the selected print data (step S1003), and requests the document information registration part 402 of the bibliographic server 203 to delete the document information of the deleted print data (step S1004). As a result, the corresponding entry is deleted from or updated in the list of document information held and managed by the document information registration part 402.

If there is no print data in the print data storage part 403 (NO to step S1001), the print data deletion part 404 starts a deletion timer for restarting the present process (step S1010), and completes the process. When the deletion timer times out, the print data deletion part 404 receives a timeout notification, and starts the present process.

Due to network disconnection or due to down of the bibliographic server 203 or the like, registration of document information sometimes fails.

Figure 8:
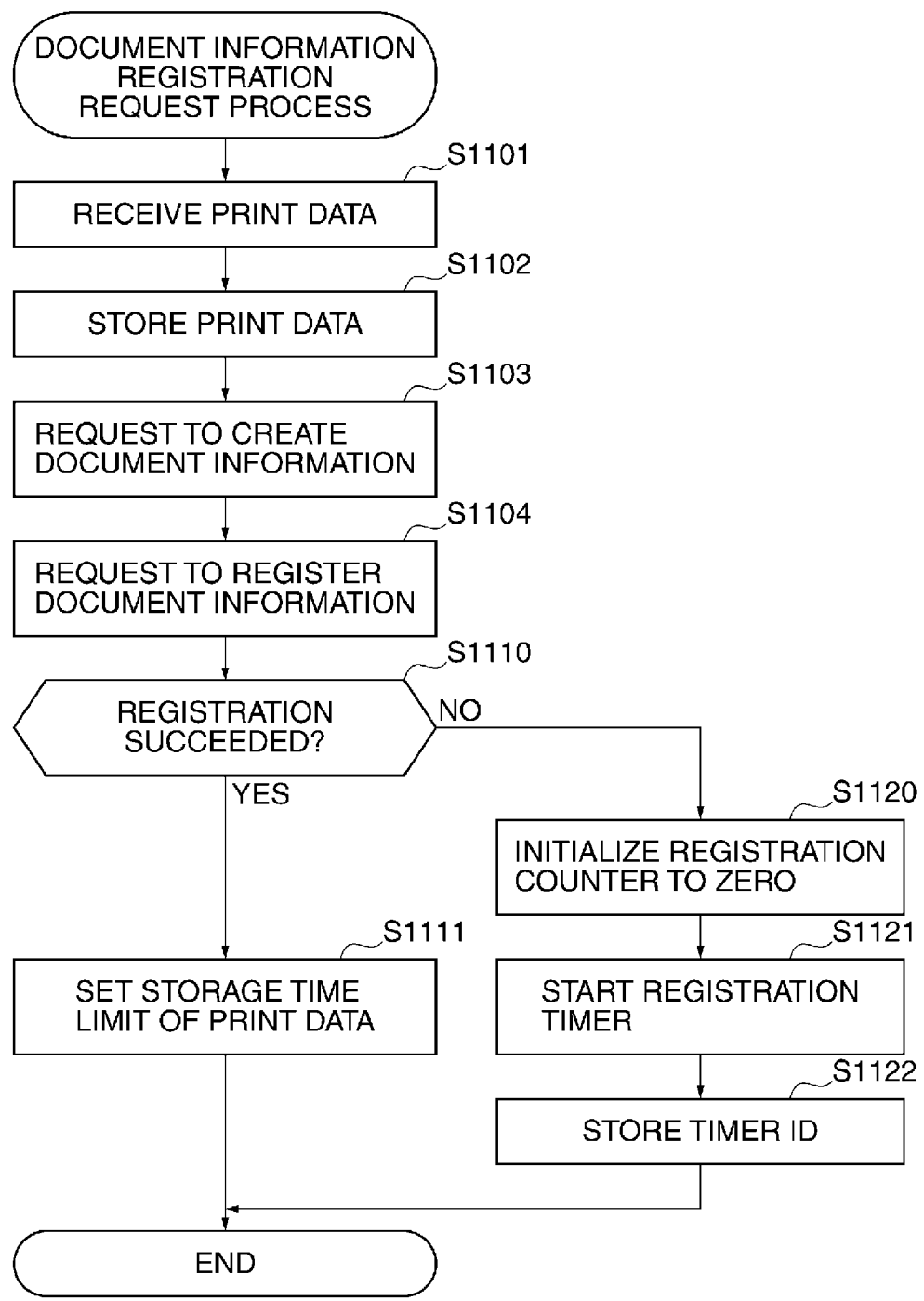
FIG. 8 is a flowchart showing a document information registration request process executed by a print information reception part of each of the image forming apparatuses.

FIG. 8 shows in flowchart the flow of a document information registration request process executed by the print information reception part 401 of each of the image forming apparatuses 203-207. In the document information registration request process, normal processing is performed when document information registration has successfully completed, whereas abnormal processing is performed when document information registration has failed.

The print information reception part 401 receives print data (step S1101), and stores the print data into the print data storage part 403 (step S1102). Next, the print information reception part 401 requests the document information registration part 402 to create document information (step S1103), and transmits the document information created by the document information registration part 402 to the bibliographic server 203 to thereby make a registration request (step S1104). Next, in step S1110, the print information reception part 401 determines whether registration of the document information to the bibliographic server 203 has succeeded or failed. If the registration of the document information has succeeded, the process proceeds to step S1111 where the storage time limit of the print data is set, and the present process is completed. On the other hand, if the registration of the document information has failed, the print information reception part 401 initializes the registration counter to zero (step S1120), and causes the registration timer to start counting (step S1121).

Next, in step S1122, the print information reception part 401 delivers, to the document information registration part 402, a timer ID as information for identifying the registration timer that has started counting. The document information registration part 402 stores the timer ID together with the document information that has failed to be registered. Then, the present process is completed.

Figure 9:
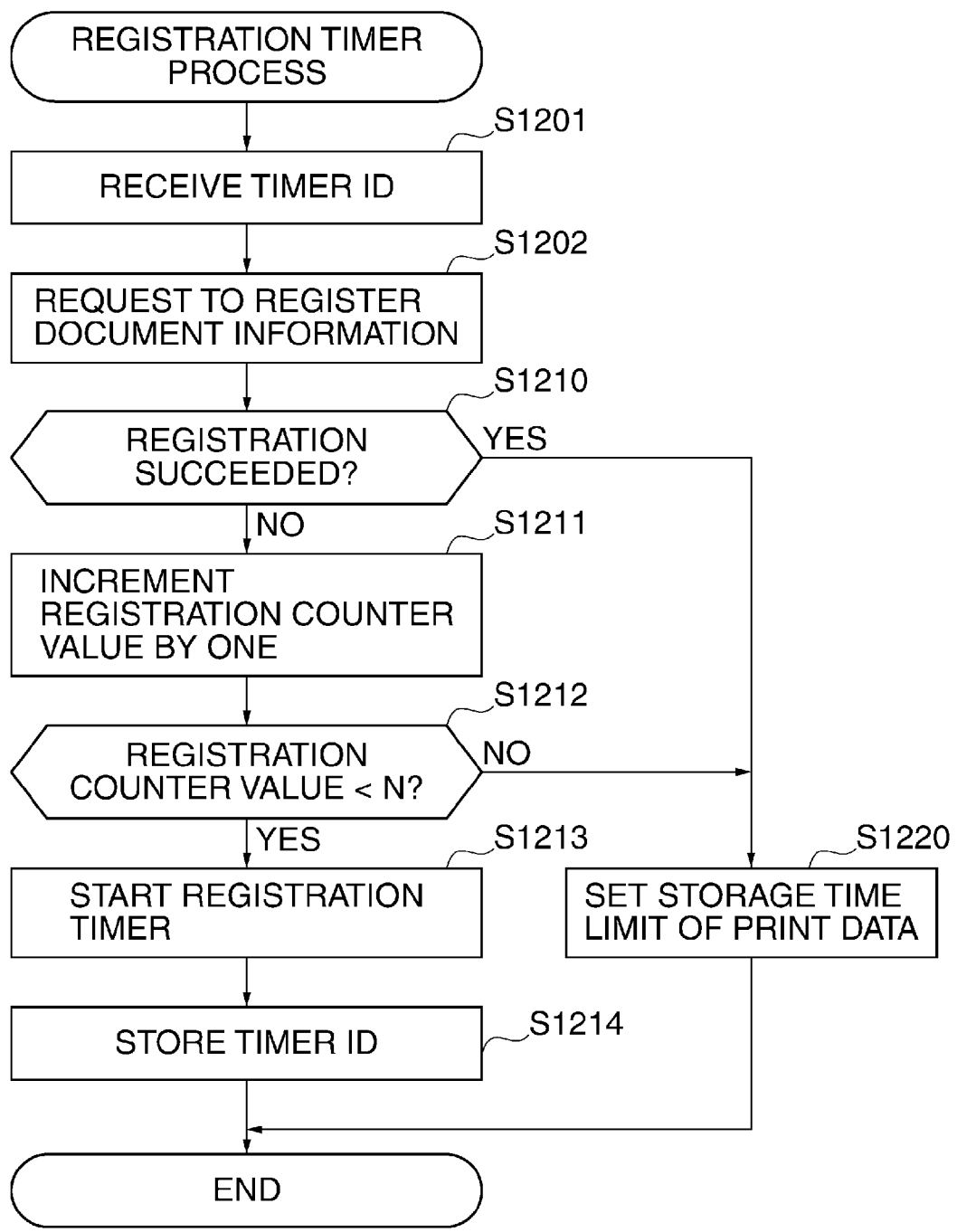
FIG. 9 is a flowchart showing the flow of a registration timer process executed by a retry registration part of each of the image forming apparatuses.

FIG. 9 shows in flowchart the flow of a registration timer process executed by a retry registration part 430.

When the registration timer that started counting in step S1121 of FIG. 8 times out, the print information reception part 401 transmits the timer ID and a timeout notification to the retry registration part 430. When the timeout notification and the timer ID are received by the retry registration part 430, the present process is started.

The retry registration part 430 receives the timer ID (step S1201), and delivers the received timer ID to the document information registration part 402 to thereby request the registration part 420 to notify document information of print data corresponding to the timer ID and transmits the document information to the bibliographic server 203 to thereby request document information registration (step S1202). In step S1210, the retry registration part 430 determines whether the registration of the document information to the bibliographic server 203 has succeeded. If the registration of the document information has succeeded (YES to step S1210), the process proceeds to step S1220 where the retry registration part 430 sets the storage time limit of the print data corresponding to the timer ID, and completes the present process.

On the other hand, if the registration of the document information to the bibliographic server 203 has failed (NO to step S1210), the retry registration part 430 increments a value of the registration counter by one (step S1211), and determines whether the incremented value of the registration counter is equal to or less than a predetermined threshold value N (step S1212). If the registration counter value exceeds the threshold value N, the process proceeds to step S1220. As previously described, the storage time limit of print data is set in step S1220. It is assumed that the threshold value N, which indicates a predetermined number of times of retry of document information registration, is set and registered in advance by the user or the like.

If the registration counter value is equal to or less than the threshold value N (YES to step S1212), the retry registration part 430 causes the registration timer to start counting (step S1213), and delivers to the document information registration part 402 the timer ID which is information for identifying the registration timer that has started counting. The document information registration part 402 stores the timer ID together with the document information that has failed to be registered to the bibliographic server 203 (step S1214), and the present process is completed.

According to the above-described embodiment, if registration of document information of received print data to the image forming apparatus 203 with bibliographic server function has failed, each image forming apparatus stores the print data without setting the storage time limit of the print data, and retries document information registration. Subsequently, if registration of the document information has succeeded before the document information registration is retried the predetermined number of times or if the document information registration is retried the predetermined number of times, the storage time limit of the print data is set and stored. As a result, even if the registration of the document information has failed, the received print data is not canceled and the print data is stored in the image forming apparatus that received the print data, so that the print data becomes capable of being printed by the image forming apparatus that received the print data. In a case where registration of the document information has failed and the print data is then printed by the image forming apparatus that received the print data, it is possible to reduce a capability that the storage time limit of the print data has expired and the print data has already been deleted when the user uses the image forming apparatus to attempt to print the print data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-101217, filed May 13, 2013, hereby incorporated by reference herein in its entirety.

What is claimed is:

1. An image forming apparatus comprising:
  a reception unit configured to receive print data;
  a registration unit configured to register information for identifying the print data;
  a storage unit configured to store the print data; and
  a control unit configured to, in a case where registration of the information by said registration unit has failed, cause said storage unit to store the print data without setting a storage time limit to the print data and cause said registration unit to retry the registration of the information,
  wherein said control unit is configured to, in both cases where the registration has succeeded and where the registration of the information is retried a predetermined number of times, set the storage time limit.

2. The image forming apparatus according to claim 1, wherein the information is registered in an external apparatus.

3. The image forming apparatus according to claim 1, wherein said control unit is configured to delete print data whose storage time limit has expired.

4. The image forming apparatus according to claim 1, wherein the information is at least one of input date of the print data, an address of an image forming apparatus stored with the print data, a storage destination in the image forming apparatus stored with the print data, a print data name, and print settings.

5. The image forming apparatus according to claim 2, further including:
  an obtaining unit configured to obtain the information from the external apparatus;
  a display unit configured to display a list of the information obtained by said obtaining unit; and
  a printing unit configured to print data selected from the list.

6. The image forming apparatus according to claim 2, wherein the external apparatus is a server or an external image forming apparatus.

7. A control method for an image forming apparatus having a reception unit configured to receive print data, a registration unit configured to register information for identifying the print data, and a storage unit configured to store the print data, the method comprising:
  causing, in a case where registration of the information by the registration unit has failed, the storage unit to store the print data without setting a storage time limit to the print data and causing the registration unit to retry the registration of the information; and
  setting, in both cases where registration has succeeded and where the registration of the information is retried a predetermined number of times, the storage time limit.

8. A non-transitory computer-readable storage device storing a program for causing a computer to execute a control method for an image forming apparatus having a reception unit configured to receive print data, a registration unit configured to register information for identifying the print data, and a storage unit configured to store the print data, the method comprising:
  causing, in a case where registration of the information by the registration unit has failed, the storage unit to store the print data without setting a storage time limit to the print data and causing the registration unit to retry the registration of the information; and
  setting, in both cases where registration has succeeded and where the registration of the information is retried a predetermined number of times, the storage time limit.

* * * * *